Nov. 19, 1963   G. SPINI   3,111,574
APPARATUS FOR TREATING MILK
Filed Aug. 12, 1960
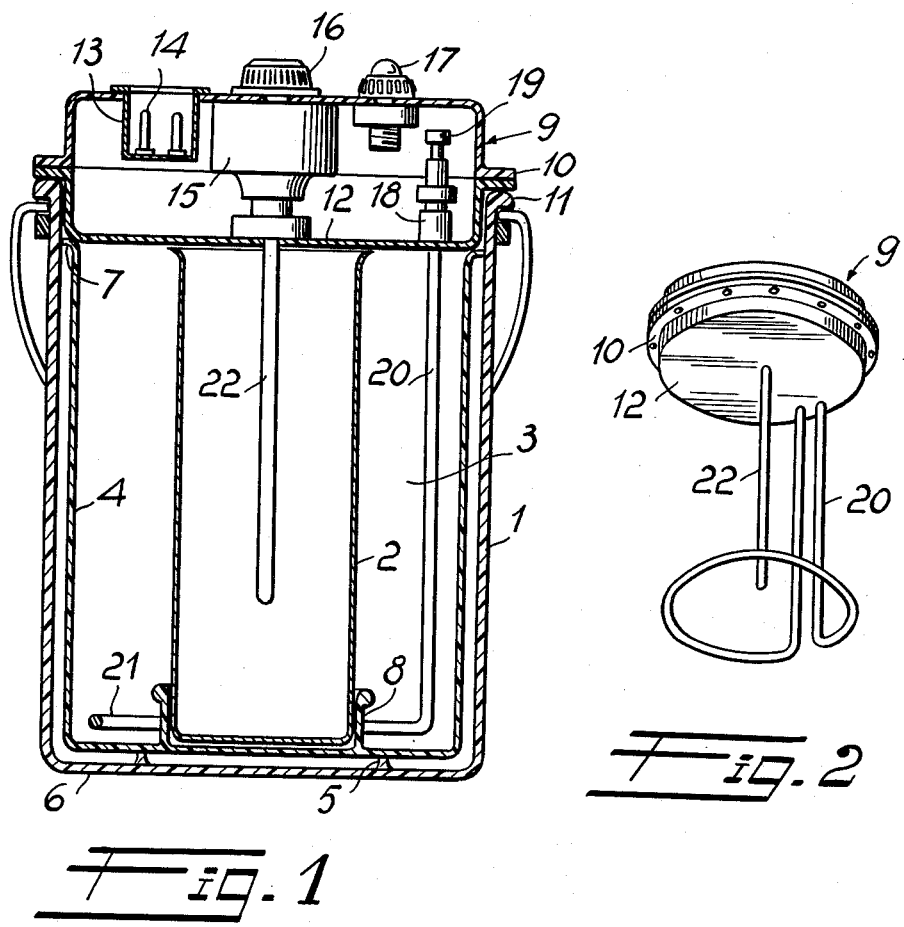
GIACOMO SPINI
*INVENTOR.*
BY *Karl F. Ross*
AGENT

United States Patent Office 3,111,574
Patented Nov. 19, 1963

3,111,574
APPARATUS FOR TREATING MILK
Giacomo Spini, Via Valenti 16,
Talamona (Sondrio), Italy
Filed Aug. 12, 1960, Ser. No. 49,336
4 Claims. (Cl. 219—44)

The present invention relates to an apparatus which includes a container into which a liquid, milk in particular, and appropriate fermenting agents can be put, and which apparatus also includes means for stimulating the fermentation of milk so as to obtain the food product known by the name of "yoghourt."

It is known that such a product can be obtained by adding to milk certain live bacteria which produce a fermentation and which at a temperature below a certain limit (about 40° C.) do not reproduce themselves, that is, are inactive for fermentation purposes, while above a certain limit (about 60° C.) these same bacteria die. Apparatuses designed to stimulate fermentation have already been proposed and these apparatuses include two concentric containers which define an inner space to be used for receiving the milk and an outer jacket interstice surrounding the said internal container and suitable for holding a certain amount of a fluid, heated separately by known means, and left to cool within said interstice.

As may readily be understood, such known apparatuses are based on the use of expedients which can be arbitrarily influence by imponderable factors, since the estimation of the cooling time of the fluid agent, or of the milk if it is boiled, until a temperature below the maximum limit of tolerance for the life of bacteria is reached, is left to subjective appraisals by the users, and since the maintenance of a proper temperature which will stimulate fermentation is accomplished by rough and ready means such as blankets, lagging or other coverings for the said containers, and this often makes it impossible to obtain the food product and always makes it a lengthy process to produce when it actually is obtainable.

An object of the present invention is to provide an apparatus which will enable all subjective judgments in the estimating of the temperatures involved to be eliminated and so make it practically certain that fermentation will occur and hence that the food product will be obtained provided that the bacteria introduced are alive.

Another object is to make the said fermentation rapid and effective by eliminating unwanted temperature drops and by keeping the surroundings at the temperature most favourable for the said fermentation.

A further object is to provide an apparatus which is relatively easy to construct and whose operation is not only simple but also reliable and constant.

These and other objects are attained, according to the invention, by an apparatus which contains two concentric containers so designed that the annular space between them forms a heating jacket or mantle, and which is characterized in that an electrical resistance is arranged in the jacket between the two containers whilst into the inner container the thermosensitive element of a thermostat connected to the said electrical resistance is introduced, which thermostat is so constructed and set that it is able to switch on and switch off the electric current whenever there is respectively a minimum and a maximum temperature inside the said inner container.

The invention will now be more fully described with reference to the accompanying drawing in which:

FIG. 1 is a vertical section through the apparatus, while

FIG. 2 is a perspective view of a lid from which the heating and thermosensitive elements of the apparatus itself project.

Referring to these figures, the apparatus comprises an outer cylindrical container 1 and an inner cylindrical container 2 of diameter less than that of the container 1, as a result of which an annular space 3 for a heating fluid is formed between the two containers. It is of advantage if at least a fair proportion of the outer container 1 has a double wall in the form of a third container 4 which has smaller dimensions than those of container 1 but larger than those of container 2, the third container 4 being preferably supported on struts 5 which jut out from the bottom 6 of the container 1, whilst at the top its bent edge 7 preferably abuts the inside wall of container 1 to form therewith an insulating air space. In practice, containers 1 and 4 with the members 5 and 7 can be made of a synthetic resin which intrinsically has excellent heat-insulating properties which are increased by the presence of the air cushion between the containers 1 and 4. For preference, provision is made of projections 8 extending upwards from the bottom of the container 4, preferably in the form of a ring, also of synthetic resin, the projections being used to center the container 2 which is preferably of chemically inert glass.

A lid 9 is placed so as to close the top of the containers 1, 2 and 4. More precisely, the lid has a male formation complementary to the female opening defined by the mouth of containers 1 and 4, as a result of which the flange 10 of the lid rests on the bent edge 11 of container 1 and the bottom 12 of the lid rests at its circumference on the bent edge 7.

This lid is preferably in the shape of a hollow cylindrical body and has various electrical means inside it. More specifically, the said lid has a cup 13 fitted with a two-pin electrical plug 14 for attachment to a double socket plug, not visible in the figure, and which can be connected by flexible conductors to the electric mains supply. A thermostat 15 is fitted to the lid in such a way that its setting dial 16, of a known type on such thermostats, projects through to the outside of the lid, while a signal light 17 also is provided on the outside of the lid. End-pieces 18 of insulating material, prefeably of synthetic resin, extending from the inner bottom wall of the lid, hold terminals 19 to which are attached the two ends of a sheathed electrical resistance-heating element 20 which goes from the lid down inside the said jacket interstice 3 and surrounds the inner container 2 with its annular end bent at right angle to the vertical portion, a certain gap or play being provided between said annular bent end of the resistance and the said container. Also from the said thermostat, extending downwards through the lid and inside container 2, is the rod 22 which constitutes the thermosensitive element.

The connections between the various electrical means are made inside the lid and are self-evident.

It is manifest that by putting water in the jacket 3 and milk with fermenting agents (e.g. those contained in a small quantity of previously existing yoghourt) in the container 2, the outside water will quickly be heated and the conditions inside the container 2 will become favourable to fermentation. It has been observed in practice that considerable quantities of yoghourt (e.g. one or two litres) are obtained within an interval of time of the order of hours.

The shapes of the containers, of the electrical resistances and of other particulars can be varied and the relative arrangement of the electrical means among themselves can also be varied in practice.

I claim:

1. An apparatus for treating milk, comprising an upwardly open outer container member, an upwardly open intermediate container member removably received concentrically within said outer member and defining therewith an annular air space insulating said intermediate member from said outer member, said intermediate member being formed at its mouth with an outwardly bent lip in substantially all-around engagement with said outer member while being freely seated therein, thereby closing said air space, an upwardly open inner container member removably seated in said intermediate member and defining therewith an annular space for a heating fluid, said inner and intermediate members terminating below the mouth of said outer member, a hollow cover extending into the mouth of said outer member while having a wall portion substantially closing the mouth of at least one of the other members, electric heating means mounted upon said cover and extending into said heating-fluid space, and thermostat means mounted in said cover for controlling said electric heating means, said thermostat means having a temperature feeler extending into said inner container member for detecting the temperature of milk received therein.

2. An apparatus for treating milk, comprising an upwardly open outer container member, an upwardly open intermediate container member removably received concentrically within said outer member and defining therewith an annular air space insulating said intermediate member from said outer member, said intermediate member being formed at its mouth with an outwardly bent lip in substantially all-around engagement with said outer member while being freely seated therein, thereby closing said air space, an upwardly open inner container member removably seated in said intermediate member and defining therewith an annular space for a heating fluid, said inner and intermediate members terminating below the mouth of said outer member, a hollow cover extending into the mouth of said outer member, said cover having a lower wall portion closing the mouth of said intermediate member and an upper wall portion spaced from said lower wall portion and defining therewith a cavity within said cover, means for detachably securing said wall portions together along the periphery of said cover, electric heating means mounted in said cover and provided with terminals within said cavity while extending into said heating-fluid space, and manually adjustable thermostat means within said cavity connected to said terminals for controlling said heating means, said thermostat means including a control member extending outwardly from said cavity through said upper wall portion for affording manual control of said thermostat means and a temperature feeler extending into said inner container member for detecting the temperature of milk received therein.

3. An apparatus for treating milk, comprising an upwardly open outer container member, an upwardly open intermediate container member removably received concentrically within said outer member and defining therewith an annular air space insulating said intermediate member from said outer member, said intermediate member being formed at its mouth with an outwardly bent lip in substantially all-around engagement with said outer member, thereby closing said air space, said outer member being formed at its bottom with an upwardly extending annular support coaxial with said intermediate member for carrying same, said intermediate member being provided at its bottom with an upwardly extending retaining ring coaxial with said intermediate member, an upwardly open inner container member removably seated within said intermediate member in said ring and defining with said intermediate member an annular space for heating fluid, said inner and intermediate members terminating below the mouth of said outer member, a hollow cover extending into the mouth of said outer member while having a wall portion substantially closing the mouth of at least one of the other members, electric heating means mounted upon said cover and extending into said heating-fluid space, and thermostat means mounted in said cover for controlling said electric heating means, said thermostat means having a temperature feeler extending into said inner container member for detecting the temperature of milk received therein.

4. An apparatus for treating milk, comprising an upwardly open outer container member, an upwardly open intermediate container member removably received concentrically within said outer member and defining therewith an annular air space insulating said intermediate member from said outer member, said intermediate member being formed at its mouth with an outwardly bent lip in substantially all-around engagement with said outer member, thereby closing said air space, said outer member being formed at its bottom with an upwardly extending annular support coaxial with said intermediate member for carrying same, said intermediate member being provided at its bottom with an upwardly extending retaining ring coaxial with said intermediate member, an upwardly open inner container member removably seated within said intermediate member in said ring and defining with said intermediate member an annular space for a heating fluid, said inner and intermediate members terminating below the mouth of said outer member, a hollow cover extending into the mouth of said outer member, said cover having a lower wall portion closing the mouth of said intermediate member and an upper wall portion spaced from said lower wall portion and defining therewith a cavity within said cover, means for detachably securing said wall portions together along the periphery of said cover, electric heating means mounted in said cover and provided with terminals within said cavity while extending into said heating-fluid space, and manually adjustable thermostat means within said cavity connected to said terminals for controlling said heating means, said thermostat means including a control member extending outwardly from said cavity through said upper wall portion for affording manual control of said thermostat means and a temperature feeler extending into said inner container member for detecting the temperature of milk received therein.

References Cited in the file of this patent

UNITED STATES PATENTS

| 1,806,004 | Tavender | May 19, 1931 |
| 2,427,146 | Lee | Sept. 9, 1947 |
| 2,623,449 | Losee | Dec. 30, 1952 |
| 2,769,564 | Hoggren | Nov. 6, 1956 |

FOREIGN PATENTS

| 304,595 | Switzerland | Mar. 16, 1955 |